United States Patent [19]
Bailis et al.

[11] Patent Number: 5,999,946
[45] Date of Patent: Dec. 7, 1999

[54] DATABASES IN TELECOMMUNICATIONS

[75] Inventors: Jason Mansfield Bailis; Karen Marie Bell, both of Novato; Terry Gregory Svetz, Kerwood; Allen Jackson, Penngrove; Robert Alan Kaplan, Kensington, all of Calif.

[73] Assignee: Harris Corporation, Melbourne, Fla.

[21] Appl. No.: 08/630,249

[22] Filed: Apr. 10, 1996

[51] Int. Cl.$^6$ ........................................... G06F 17/30
[52] U.S. Cl. ................ 707/201; 707/104; 379/93.04; 379/201; 379/207; 379/32; 455/404; 395/712; 709/35; 709/226
[58] Field of Search ..................... 395/615, 712; 379/201, 207, 93.04, 32; 707/201, 104; 709/35, 226; 455/404

[56] References Cited

U.S. PATENT DOCUMENTS

| | | | |
|---|---|---|---|
| 4,899,373 | 2/1990 | Lee et al. | 379/207 |
| 4,980,906 | 12/1990 | Forson et al. | 379/32 |
| 5,022,070 | 6/1991 | Forson et al. | 379/32 |
| 5,287,504 | 2/1994 | Carpenter et al. | 395/615 |
| 5,329,581 | 7/1994 | Friedes et al. | 379/92 |
| 5,388,147 | 2/1995 | Grimes | 379/59 |
| 5,390,241 | 2/1995 | Bales et al. | 379/207 |
| 5,404,396 | 4/1995 | Brennan | 379/201 |
| 5,410,703 | 4/1995 | Nilsson et al. | 395/700 |
| 5,432,931 | 7/1995 | Woess et al. | 395/650 |
| 5,436,966 | 7/1995 | Barrett et al. | 379/265 |
| 5,459,779 | 10/1995 | Backaus et al. | 379/201 |
| 5,463,683 | 10/1995 | Collins et al. | 379/201 |
| 5,471,629 | 11/1995 | Risch | 395/800 |
| 5,475,746 | 12/1995 | Miller et al. | 379/201 |
| 5,555,375 | 9/1996 | Sudama et al. | 395/200.03 |
| 5,555,418 | 9/1996 | Nilsson et al. | 395/700 |
| 5,559,955 | 9/1996 | Dev et al. | 395/182.02 |
| 5,572,727 | 11/1996 | Larsson et al. | 395/616 |
| 5,661,790 | 8/1997 | Hsu | 379/92.09 |
| 5,692,033 | 11/1997 | Farris | 379/67 |
| 5,732,128 | 3/1998 | Bushnell | 379/119 |

OTHER PUBLICATIONS

C.J. Date, "An introduction to database systems", sixth edition, Aug. 1995.

*Primary Examiner*—Thomas G. Black
*Assistant Examiner*—Jean M. Corrielus
*Attorney, Agent, or Firm*—Rogers & Killeen

[57] ABSTRACT

A telephone switch system is connected digitally to an external computer system operating database software and having access to a digitally stored database of information used by the switch. The switch performs data transactions on the database in the manner of a client. The database engine allows live queries, which automatically update querying clients as pertinent data changes. The database engine also allows query concentration, which caches query results and supplies the cached results to querying clients making identical queries within a prescribed period of time. The database engine further allows batch inserts, which allow a user to add a plurality of records with a single command.

7 Claims, 5 Drawing Sheets

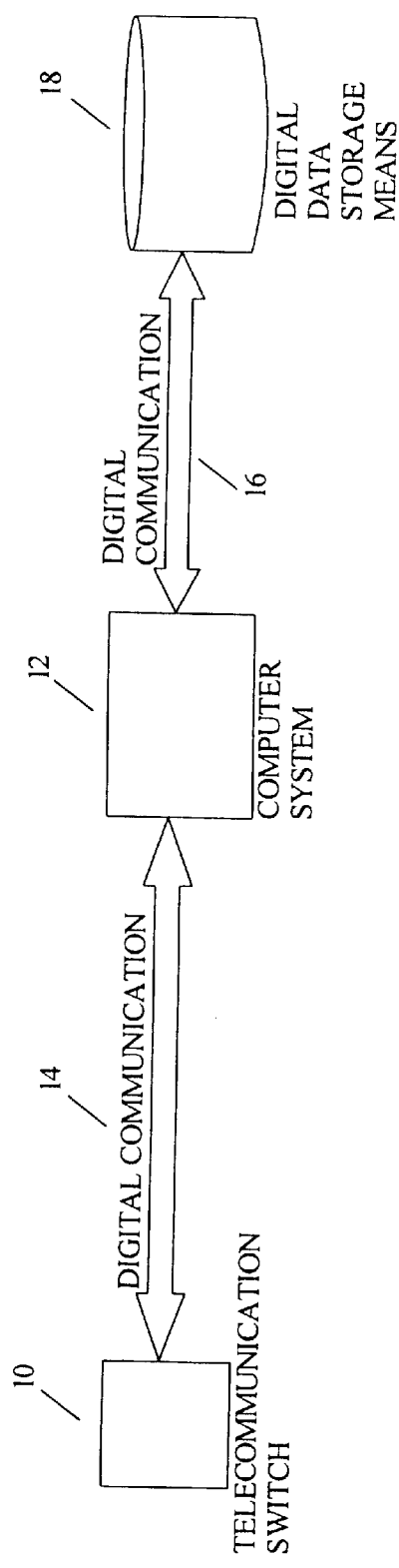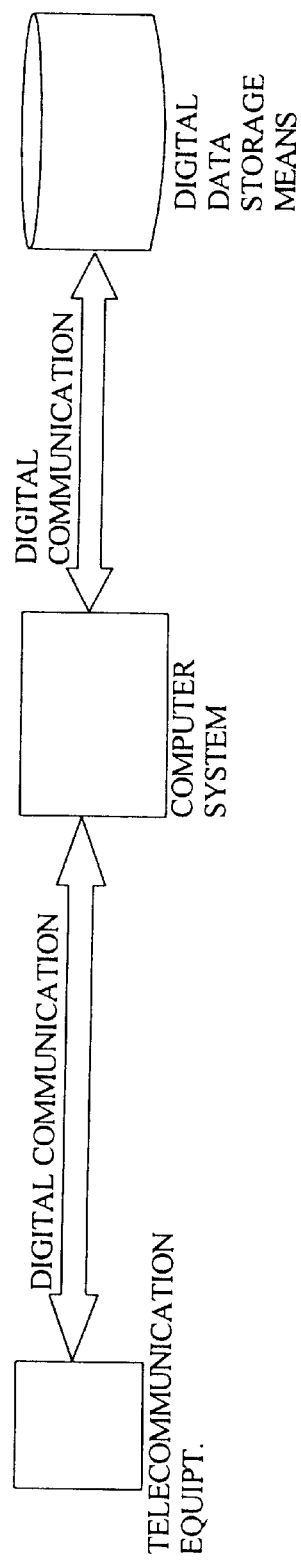

DATABASES IN TELECOMMUNICATIONS

BACKGROUND OF THE INVENTION

The present invention relates in general to the use of standard database management software in the context of a complex electronic system and in particular to the use of a commercial database management system in a telecommunication switch.

Telecommunication switches are required to manipulate very large amounts of data with very low latency time. Generally in the prior art, the data which is manipulated in such systems has been organized to facilitate the hardware operation and/or has been organized in ways related to the use of the data and not relationally. As such, typical computer data report generation, updates, maintenance and similar tasks in telecommunication switches have been accomplished by specially-prepared computer programs designed specifically for the particular switches associated therewith. As is well known, most software has within its structure a plurality of "bugs" or programming instructions which do not operate correctly for all potential operating conditions. Generally, the longer such programs are operated the more such "bugs" are identified and can be removed or repaired. The specifically-programmed software within telecommunications switches follows the general trend as to its propensity to contain errors. However, because much of the prior art specifically-programmed switch software is changed whenever the hardware is changed, such software's lifespan is limited and the robustness which is achieved only through time is never obtained.

Commercial database management software has existed for a number of years and has been able to provide the data management functions. Because such software typically has wide usage, it is often able to obtain a sufficient lifespan to enter a stage of relatively few coding errors.

Given the need to accomplish database type tasks in telecommunication switches, it would be desirable to use standard widely-use database management software in conjunction with such hardware. Such usage has not been made in the past, however, because most such commercial software has been too slow to satisfy the stringent speed requirements of real-time telecommunications equipment and because the design of the telecommunications switch control systems were generally not readily adaptable to the forms required for commercial database management software. For these reasons, proprietary telephony software has evolved for data manipulation which varies over time and amongst installations. Such custom software generally has all of the difficulties mentioned above and is generally relatively expensive. Additionally, reconciling differences in standards has led to further complications and their attendant inefficiencies.

Many improvements could be realized through the use within telecommunications equipment of standard, commercially available database software. Particularly where the standard database management system can be a standard commercial system, the use of such a system can significantly improve and simplify the management of data in an area in which data management is crucial and must be performed in real time.

In accordance with the present invention, a commercial database can be used with a telecommunication switch in a variety of configurations. In contrast to some systems in the prior art in which the database was within a switch itself. The present invention may involve a topology in which the database software and the hardware upon which it is executing is located outside the switch itself. An advantage of such a system is that details of the database implementation are transparent to the call processing software in the switch. Further, other database clients can be allowed direct access to the database through a standard interface without permitting such other clients access to the call processing software and/or operations.

Another aspect of the present invention also addresses modifications to features of standard databases which improve their utility in the context of a telecommunication switch. One improvement is the addition of a database command which provides updates to a querying client as the results of the query change over time. This feature is particularly important in the dynamic world of telecommunication applications.

The prior art discloses such a database management feature in the context telecommunications data only with respect to resynchronizing multiple databases, not with respect to a database and a querying client. Other prior art discloses the similar automatic update features for database software, but not in the context of a telecommunication application.

One means of providing efficiency to the operation of a database system which can be accessed by multiple clients is to cache similar results. In other words, if two clients simultaneously or nearly so request similar searches of the database, only one search is performed and the results are provided to both clients. One difficulty with such systems, however, is the currency of the data in the cache of search results. If the underlying data have changed, the cached results may longer be valid; however, the search cache may return the still-cached results nonetheless. This problem in some prior art systems is exacerbated in realtime systems such as in some telecommunications equipment. Known database cache systems generally do not allow for a variable timer as the determinant of cached data validity.

Another aspect of the present invention is the capability within the database of a dynamic telecommunication system to cache query results and provide the cached results instead of performing a redundant search upon receipt of an identical query. This improves response time to many queries, which is particularly important in a telecommunications context. The validity of the cached data may be determined by the amount of time that has passed since the original query. This time limit may be programmably variable.

Another aspect of the present invention is the capability to update a database using batch inserts. Such a capability provides a client with a method of inserting many records into a database with a single command. This is particularly important in the area of telecommunications data, where activities such as creation of records for a large group of subscribers with unique phone numbers would be tedious without such a capability. This command may also provide the ability to specify incremental parameters. For example, a large number of phone numbers may be inserted with each number incrementing by five over the previous number.

The prior art discloses commands which perform actions on multiple entries. Generally, such prior art systems do not, however, provide a means to insert multiple records with varying data as in the present invention.

Accordingly, it is an object of the present invention to provide a novel method of managing data for a telecommunication switch by using a standard database immediately adjacent to such a switch.

It is another object of the present invention to provide a novel method of manipulating a database through the addition of a command to a database protocol which maintains information about a query and updates a querying client as query results change.

It is yet another object of the present invention to provide a novel method of caching query results such that queries which are identical to prior queries receive cached results instead of requiring redundant data gathering.

It is still another object of the present invention to provide a novel method of caching query results wherein the validity of cached data is determined by the elapsed time since the original query.

It is still yet another object of the present invention to provide a novel method of manipulating a database through the addition of a command to a database language which allows a plurality of records to be inserted into a database with a single command.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 1 is a high level representation of the elements of a telecommunications system in which the present invention may be utilized.

FIG. 2 is a high level representation of the elements of a telecommunication system in which the present invention may be utilized.

DESCRIPTION OF PREFERRED EMBODIMENTS

Figure 3:
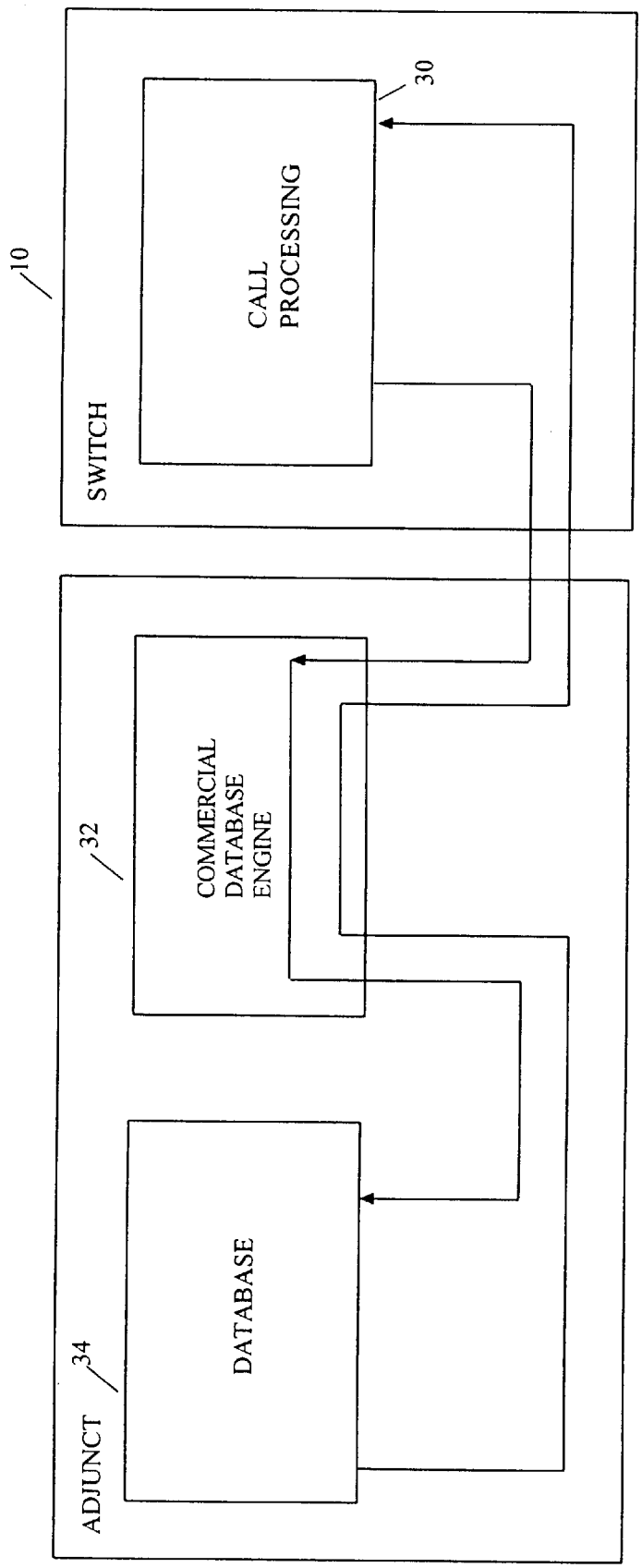
FIG. 3 is a partial block diagram of a telephone switch and control system using the present invention.

With reference to FIG. 1, the elements of a telecommunications system in which the present invention may be implemented include a telecommunication switch 10 connected to a computer system 12 through a digital communication means 14. A second digital communication means 16 links the computer system 12 to a digital data storage means 18. The elements shown in the telecommunications system may be housed together or mutually remotely. In operation, the telecommunications switch serves to interconnect telephone lines or trunks (not shown) in a conventional fashion. The computer system 12 may communicate with the telecommunications switch 10 through the conventional digital communications means to provide commands and/or data to the switch 10 and to receive status information from the switch 10. The telecommunications switch may also include computer circuits (not shown) which implement the desired switching capability for the many call processing operations of the switch 10.

With reference to FIG. 3, in which similar elements bear similar reference numerals as the elements in Fig.1, a call processing ("CP") system 30, may be logically perceived as being contained in the switch 10. The CP system manages the telephone communications through the switch. In one aspect of the present invention, the CP system is designed to act as a client to a database engine 32, typically located outside the switch 10. In such a configuration, the database engine 32 is accessible by other clients in addition to the CP system 30. In conventional (for non-telecommunications systems) database query fashion, the CP system 30 does not access the data directly, but issues commands such as queries and inserts to the database engine, which in turn accesses a database 34. The database engine 32, in turn, may access digitally stored data on the database 34, either writing to or reading from the database 34, and, in the case of a query, returns the data to the CP system 30.

The database engine 32 may be any suitable commercial database engine, particularly one which is accessible by multiple clients simultaneously.

Other aspects of the present invention may be implemented in the database engine 34, by modifying a commercial database engine or by implementing the aspects in an interface to the commercial database engine or by other conventional means to add the capabilities to a standard database system. These aspects of the present invention allow data manipulation in a manner suited to the use of a commercial database for a telephone switch context.

In another aspect of the present invention, the database system may have the capability of live query, which represents an alternative to a standard database query. A standard database query returns the records of the database which meet the query criteria at the moment of the query. A change to the database immediately after the extraction of the data is not passed on to the querying client.

Figure 4:
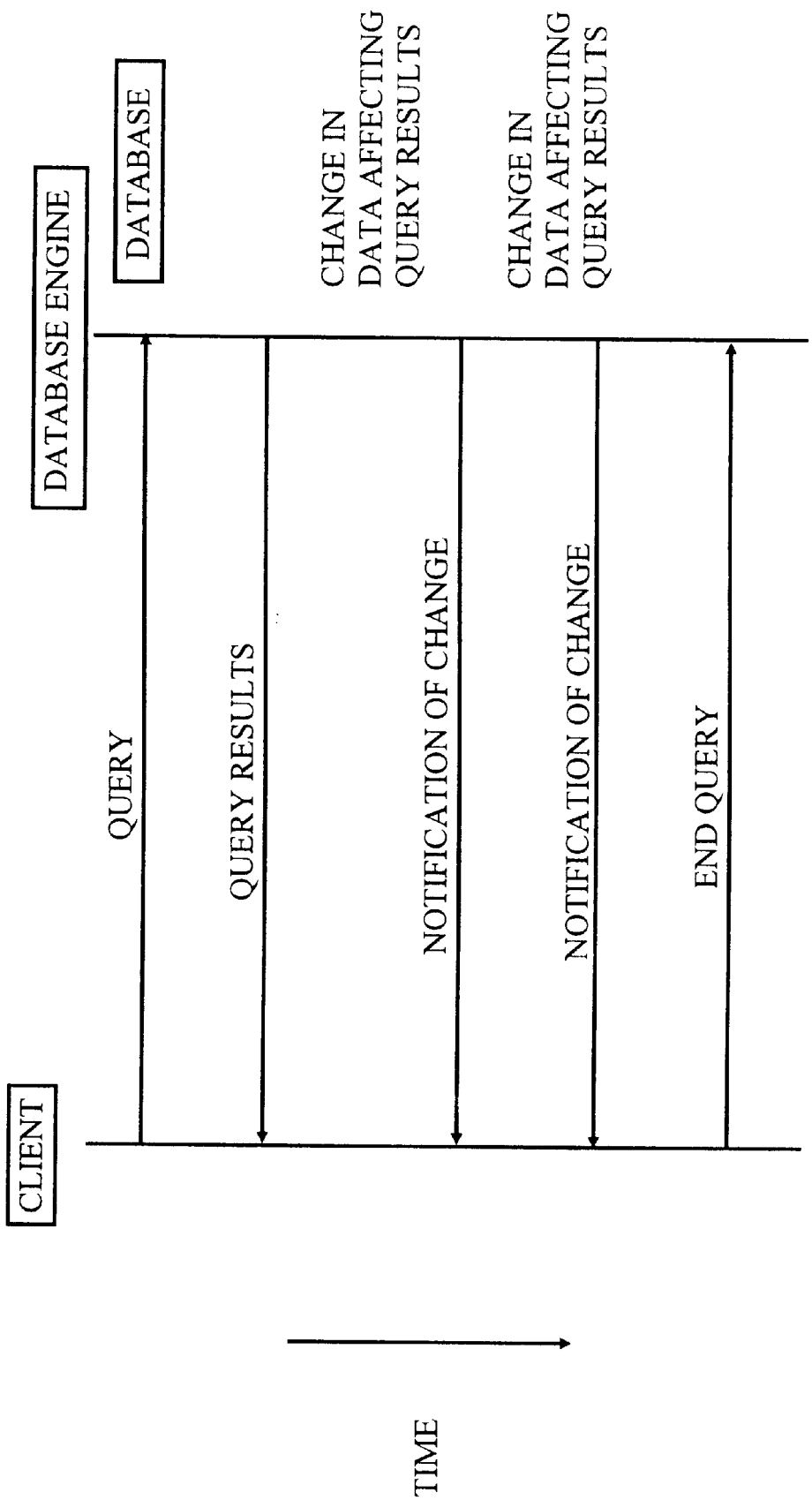
FIG. 4 is a timing diagram showing the interaction between a database engine and a client during a live query in a system of the present invention.

With reference to FIG. 4, in a live query, a querying client (such as a user of the database 34) creates a standing query which lasts until the query is ended. The client begins by issuing the live query and receiving the appropriate data from the database engine. At this point, the database engine, instead of treating the query as concluded, continues to monitor the database to detect changes to the query results. Should the database change to remove or add records to those that originally met the criteria of the query, the database informs the client of the change. This process continues until the querying client indicates the conclusion of the query.

Figure 5:
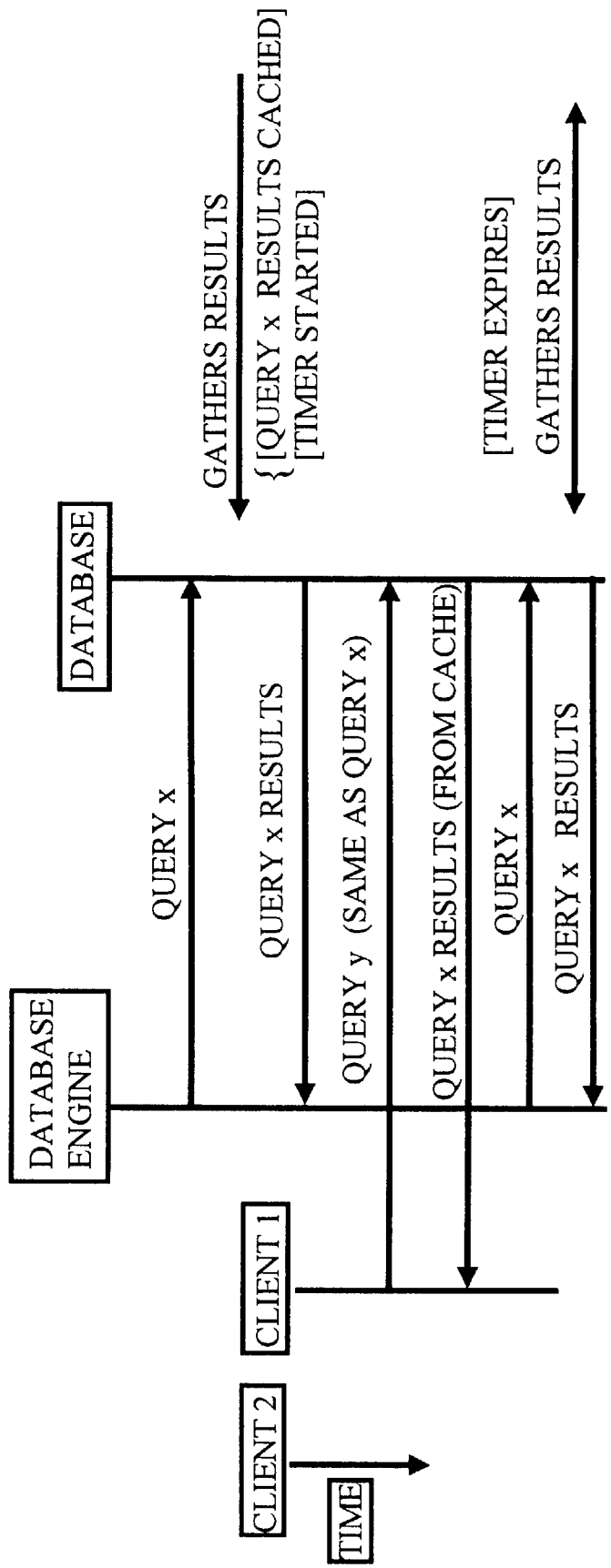
FIG. 5 is a timing diagram showing the interaction between clients and a database engine in which query concentration is performed by the database engine in a system of the present invention.
Figure 6:
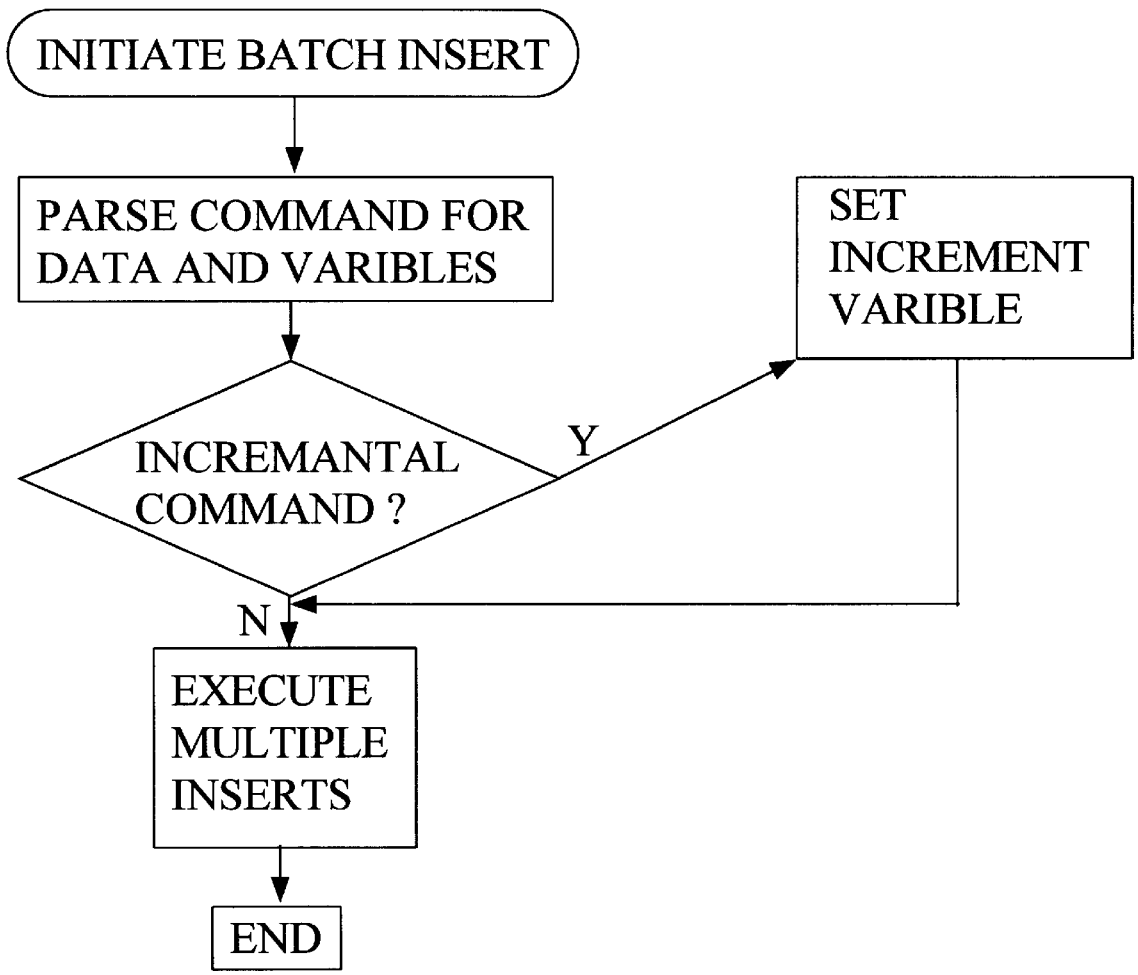
FIG. 6 is a flow chart depicting the actions taken by a database engine upon receiving a batch insert command in a system of the present invention.

Another aspect of the present invention addresses query concentration. According to this aspect of the invention, query results are stored by the database engine in local cache. With reference to FIG. 5, the query results may be saved as long as they are considered valid. According to one embodiment, the validity of the cached data is determined by the amount of time that has passed since the original query results were obtained. The duration of such a time period can be determined empirically for a given system.

For as long as the data is valid, the database engine supplies subsequent, identical queries with the data from cache instead of reexecuting the search of the database that originally produced the cached results. Such subsequent querying clients may be either the same client that issued the original query or a different client. If a different client makes the subsequent query, the database engine may redirect the query to the initial client to provide the data. The timer which is used to determine data validity may be programmable. A programmable timer would allow the database to adjust dynamically to changing conditions.

In another embodiment, live queries may be combined with query concentration. In such an embodiment, cached query results may be provided by the database engine if no updates to the data have occurred, which may be determined in a manner similar to that used in live queries.

Another aspect of the present invention allows the possibility of batch inserts to the database. Generally, current database systems do not allow the addition of multiple records into a database by a single command. According to one aspect of the present invention, the user may specify that simultaneous records are to be created in the database 34. The created records might contain identical data or may represent a sequence or other arrangement of data. If a sequence is desired, the starting number and increment may be provided as part of the command.

One particular use of this command in telecommunication systems involves the creation of subscribers. In this context, a user would, with a single command, create record entries for a group of subscribers with unique phone numbers.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A telecommunication switching system comprising:
    (a) a telecommunication switch;
    (b) a computer system located external to said telecommunication switch, said computer system executing standard database software;
    (c) means for digital data communication between said computer system and said telecommunication switch;
    (d) means for digital data storage accessible by said computer system and by said database software; and
    (e) call processing software executing within said telecommunication switch, said call processing software able to manipulate said digital data through said database software.

2. A method for allowing a telephone switch to store and retrieve digital data, said digital data stored in a database on digital data storage means, said storage means accessible by a computer system, said computer system operating standard database management software, said computer system and storage means physically located external to said switch, said switch having client access to said database software through said computer system, said method comprising the steps of:
    (a) adding data to a database to reflect the current status of a telephone system by performing client inserts through said database software; and
    (b) extracting data from the database to determine status of the telephone system by performing client queries through the database software.

3. An apparatus for management of data as part of a telecommunication system, said apparatus comprising:
    (a) telecommunication equipment;
    (b) a computer system, said computer system connected to allow digital communication with said telecommunication equipment;
    (c) means for digital data storage accessible by said computer system and by a database software; and
    (d) said database software allowing database clients to manipulate said data in a database, said database stored in said digital data storage means, said telecommunication equipment connected to said computer system as a client and able to access said software as a client, said database software also allowing said database clients to query said database software, said database software providing notice to said clients as to changes in query results during duration of said query.

4. An apparatus for management of a database as part of a telecommunication system, said apparatus comprising:
    (a) telecommunication equipment;
    (b) computer system, said computer system connected to allow digital communication with said telecommunication equipment;
    (c) means for digital data storage accessible by said computer system and by a database software; and
    (d) said database software allowing database clients to manipulate information in a database, said database stored in said digital data storage means, said telecommunication equipment connected to said computer hardware as a client and able to access said software as a client, said software also allowing said database clients to insert multiple records into said database through a single command to said database software.

5. An apparatus for management of a database as part of a telecommunication system, said apparatus comprising:
    (a) telecommunication equipment;
    (b) computer system, said computer system connected to allow digital communication with said telecommunication equipment;
    (c) means for digital data storage accessible by said computer system and by a database software; and
    (d) said database software allowing database clients to manipulate information in a database, said database stored in said digital data storage means, said telecommunication equipment connected to said computer hardware as a client and able to access said software as a client, said software storing query results in a cache storage, said software supplying query results from cache for subsequent identical queries while cached data is still valid.

6. The apparatus of claim 5 wherein validity of said cached data is determined by comparison of time between original query and subsequent query is compared to a maximum allowed time.

7. The apparatus of claim 6 wherein said maximum allowed time is configurable.

* * * * *